April 26, 1938. W. V. OVERBAUGH 2,115,211
CONTINUOUS FILTRATION OF WAX BEARING OIL
Filed Aug. 9, 1934
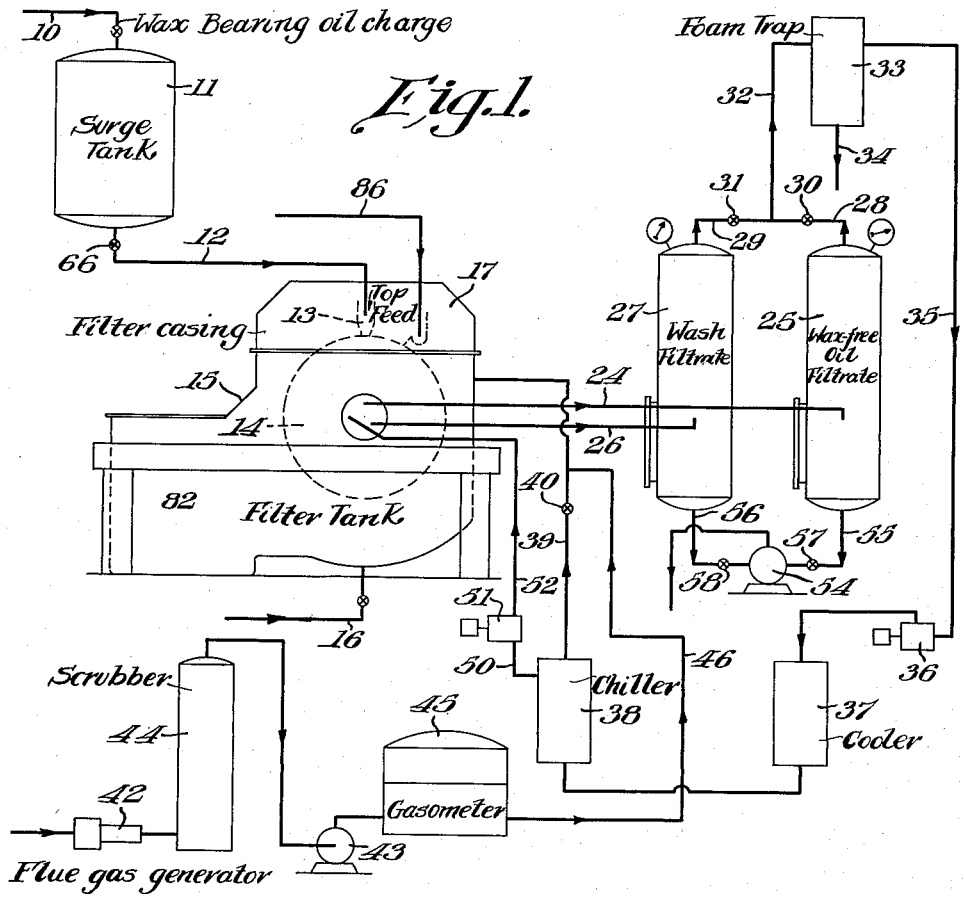
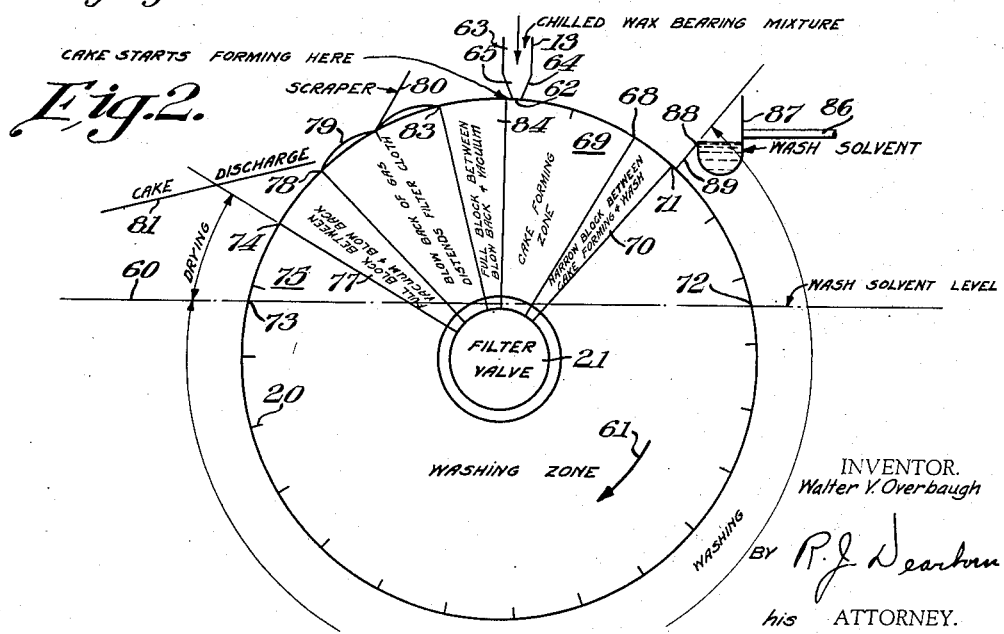
INVENTOR.
Walter V. Overbaugh
BY
his ATTORNEY.

Patented Apr. 26, 1938

2,115,211

UNITED STATES PATENT OFFICE 2,115,211

CONTINUOUS FILTRATION OF WAX BEARING OIL

Walter V. Overbaugh, Fishkill, N. Y., assignor to The Texas Company, New York, N. Y., a corporation of Delaware Application August 9, 1934, Serial No. 739,059

7 Claims. (Cl. 196—19)

This invention relates to the dewaxing of mineral oil by filtration, and to an improved process of continuous filtration applicable thereto, and to improved continuous filter constructions for carrying out that method.

It has heretofore been proposed to continuously filter wax from a chilled wax bearing oil on a continuous filter of the rotary drum or disc type. The chilled wax bearing mixture is supplied to the vat in which the rotary filter is partially submerged. The filter operates to form a wax cake thereon during its travel through the wax bearing mixture in the vat, and the wax cake on the filtering surface is then washed, dried and discharged after emergence from the bath. The successful application of such a process to commercial dewaxing has been achieved by the use of an enclosed filter to which a chilled fluid is supplied and continuously drawn through the filtering surface in order to maintain the latter at substantially the temperature of the chilled wax bearing mixture being filtered, whereby to prevent plugging of the filtering surface, as described in copending application Serial No. 718,347, filed March 31, 1934.

In the filtration of certain wax stocks having a high wax content and free filtering characteristics, it is found that such a thick wax cake is continuously formed during the pick-up or cake forming cycle that the cake cannot be effectively washed free from retained oil during the washing portion of a continuous cycle. Consequently, lower yields of dewaxed oil were obtained. In order to counteract this tendency, a lower submergence of the drum filter in the chilled wax bearing mixture may be used, such for example as a submergence in which only approximately 40% of the filtering surface is beneath the liquid level. This serves to increase the emerged portion of the filtering surface to afford additional washing time. Also, the vacuum on the filter in the pick-up or cake forming zone may be decreased so that thinner cakes will be obtained which can be more effectively washed in the washing part of the cycle. However, this method of reducing yields has the disadvantage of lowering the filtration rates, thus reducing the capacity of the filter.

An object of the present invention is to provide a method of continuous filtration, which is applicable to the filtration of oils of high wax content, and which at the same time enables high filtration rates and high yields of filtrate or dewaxed oil to be obtained.

A further object of the invention is to provide continuous rotary filtration apparatus of simple and economical construction suitable for carrying out the above method.

Other objects and advantages of the invention will be apparent from the following description, the accompanying drawing and the appended claims.

In the drawing, which illustrates a preferred embodiment of apparatus for carrying out the method of the present invention, Fig. 1 is a diagrammatic view of apparatus for carrying out the method of the present invention as applied to the dewaxing of a mineral oil; and Fig. 2 is a diagrammatic view illustrating the filtering cycle.

The invention contemplates the process of filtering solid hydrocarbons or paraffin wax from liquid hydrocarbons on a rotary filtering surface which consecutively submerges within liquid and then emerges therefrom on each cycle, in which the chilled wax bearing mixture to be filtered is supplied in a continuous stream by a top feed to the emerged filtering surface while the latter is subjected to a pressure differential such as to cause oil to pass through the filtering surface and form a wax cake thereon. Washing solvent is supplied to the vat within which the filter dips, so that continued rotation of the filter carries the formed wax cake beneath the liquid level of the washing solvent, where pressure differential causes solvent to pass through the cake and filtering surface, thereby removing remaining oil from the cake. The washed cake is then continuously removed from the filtering surface after the latter has emerged from the liquid bath. A further increase in ratio of washing time to cake forming time may be obtained by supplying additional washing solvent to the cake after formation and prior to submergence within the liquid bath.

Referring to the drawing, wax bearing mineral oil to be filtered is conducted by line 10 to surge tank 11 and thence by line 12 to the top feed 13 which discharges onto the upper exposed portion of a rotary drum filter 14. The wax bearing mineral oil may be mixed with a solvent liquid or wax precipitating medium, such as a light petroleum fraction, or various other organic solvent liquids or mixtures thereof, including alcohols, ketones, aldehydes, cyclic hydrocarbons, benzol or its homologues, or derivatives of these various materials. A very satisfactory solvent liquid comprises a mixture of acetone and benzol, or a mixture of acetone, benzol and toluol. The mixture of oil and solvent liquid is passed through a chilling coil (not shown) where it may be chilled to a temperature of around 0° F. or below, the chilled mixture being then supplied to line 10.

The filter 14 is mounted for rotation on the vat or tank 15, and is positively rotated at controlled speed in any suitable manner (not shown), as by an electric motor through a transmission and reducing gearing. Washing solvent is supplied to tank 15 by the valve controlled line 16 to a predetermined level to partially submerge the filter. As shown more particularly in Fig. 2, the filter is preferably operated at around 60% submergence, although this may be varied. The filter is preferably enclosed, having a hood 17 which may be fastened in gas tight relationship to the vat 15, as by a liquid seal. The exterior of the filter vat and hood may be covered with heat insulating material to facilitate maintaining the interior in a cool condition.

The filter 14 is advantageously of the hollow drum type, having a peripheral filtering surface formed of cloth or other porous filtering material. The filtering surface is divided by division strips 20 into a plurality of longitudinal segments or chambers, which are connected by suitable pipes to the customary axial filter valve 21 which controls the application of suction and the supply of pressure blow back gas to the interior of the filtering segments at various stages in the cycle of rotation of the filter.

In the cake forming stage of the cycle, filtrate oil is discharged from the control valve 21 through line 24 to tank 25. Wash filtrate is discharged through line 26 to tank 27. The upper portions of tanks 25 and 27 communicate through lines 28 and 29, respectively provided with valves 30 and 31, with a common suction line 32 leading to a foam trap 33 having a gravity discharge leg 34. Gas is withdrawn from foam trap 33 through line 35 by vacuum pump 36, and supplied under low pressure to preliminary cooler 37 and thence through chiller 38 and line 39 containing pressure reducing valve 40 to the interior of the closed filter casing to maintain the chilled gaseous atmosphere therein. By the valve controls 31 and 30, different vacuums or pressure differentials may be maintained by a common vacuum pump on the filtering surface in the cake forming zone and the washing zone respectively. For example, a lower vacuum may be applied in the washing zone than in the cake forming zone. To take care of gas losses, fresh gas may be prepared in flue gas generator 42 and drawn by pump 43 through scrubber and dehydrator 44, and forced into gasometer 45. From the latter, gas is supplied through line 46 to line 39 beyond valve 40, and thus to the interior of the filter casing, to make up for any gas loss and to maintain the quantity and pressure of gas within the circulating system. The gas referred to herein may include air, flue gas, hydrocarbon vapor, fixed gases such as nitrogen, etc. Flue gas is advantageously used because it is relatively inexpensive and reduces the fire and explosion hazards when employing inflammable solvents.

A branch line 50 leads from chiller 38 to an auxiliary pump 51, which serves to force chilled gas at a regulated positive pressure, which is independent of fluctuations of pressure in the main circulating system, through the blow back line 52 to the interior of filter 14 for discharge of the cake at the proper point in the cycle of rotation of the filter. A liquid discharge pump 54 serves to withdraw oil filtrate and wash filtrate through lines 55 and 56, respectively controlled by valves 57 and 58, and forces the same through discharge line 59 leading to a suitable solvent recovery unit where the contained solvent is removed from the oil.

Fig. 2 shows diagrammatically and in outline a rotary vacuum continuous filter of the type used in Fig. 1, with the filtering cycle indicated thereon. The liquid level of the wash solvent within vat 15 is indicated at 60, representing approximately 60% submergence of the filter. The filter rotates in the direction of the arrow 61, and cake formation starts at 62 where the top feed 13 discharges upon the upper emerged portion of the filter. The top feed 13 may be of any suitable construction, that shown being formed as a longitudinally extending channel 63 having a tapered end 64 terminating in a longitudinal discharge slot 65. The flow of chilled mixture may be controlled by suitable valve 66 within line 12. Or a top feed of the type of a Fourdrinier inlet as employed in conventional paper making machines, having a lower apron board across which a continuous stream of the chilled mixture flows onto the surface of the filter in the direction of its rotation, as controlled by an upper adjustable lip member spaced from the apron board, may be employed. The filter valve 21 opens at 62 to communicate suction to the filtering surface, which suction continues to the point 68 to provide the cake forming zone 69. The filtered oil from this section is discharged through the filtrate line 24 as previously described. As the filtering segments consecutively pass the point 68, communication with the filtrate outlet is cut off; and after a short rotation past the narrow block 70, communication with the washing and drying port of the valve is initiated at 71. At this time, wash filtrate is discharged through line 26 as previously described.

In the handling of certain types of stocks, the zone from the point 71 to the wash solvent level at 72 may be utilized as an initial drying zone, in which the pressure differential on the filtering surface causes the chilled gaseous atmosphere surrounding the filter to act upon the cake to drain or strip retained oil from the cake. The washing of the drained cake then commences at 72, and continues throughout the complete time of submergence to the point 73, where the filter again emerges from the liquid level. The vacuum communicated through the wash discharge line 26 is continued for a further period of rotation to the point 74, to provide a further drying zone 75, which serves to remove retained wash solvent from the cake. At this time, further quantities of cold gas from the atmosphere surrounding the filter are drawn through the filtering surface to displace wash solvent as well as to maintain the filtering surface chilled to a low temperature. The wash solvent supplied by line 16 is also chilled to a temperature approximating the temperature of the wax bearing mixture being filtered to further aid in preventing re-solution of wax in the solvent and to avoid plugging of the filtering surface. A full block 77 separates the termination of the vacuum and the initiation of blow back at 78. At this time, chilled gas under pressure is discharged from line 52 through the corresponding passage in the valve 21 to the interior of the segments of the filter, causing distention of the filter cloth as indicated at 79. This, assisted by scraper 80 serves to remove the formed and dried filter cake, which is discharged down the inclined trough or chute 81 into a suitable discharge chamber 82 within the filter casing, from where the wax cake may be removed in any suitable manner. The reverse flow of chilled gas or blow back terminates at 83, and a full block indicated at 84 separates the termination of the cake discharge zone from the beginning of the cake forming zone at 62; whereupon the cycle is repeated.

Where a higher ratio of washing time to cake forming time is desired, a further quantity of wash solvent may be supplied to the cake in the zone between points 71 and 72, which is just after cake formation but prior to submergence of the cake in the liquid bath. As shown, chilled wash solvent may be supplied by line 86 to a longitudinally extending trough 87 having an overflow or weir feed 88 which discharges a film of washing solvent down the inclined guide 89 and onto the surface of the cake on the filter. Sufficient solvent may be applied at this point to maintain the cake comparatively moist up to the point of submergence at 72. Further washing time is then afforded during the period of submergence from 72 to 73.

I am aware that top feed vacuum filters have been heretofore employed in other arts, particularly in paper making. But so far as I am aware, it has not been heretofore suggested to utilize the principles of the top feed vacuum filter in the dewaxing of mineral oil where special problems of proper and effective washing of the cake are encountered, particularly in connection with oil stocks of high wax content, such for example as East Texas distillates. Furthermore, the provision of a top feed filter of this character, coupled with means for washing the wax cake by submergence in a bath of wash solvent, followed by discharge of the wax cake after emergence from the liquid bath is believed to constitute a new principle of operation in the dewaxing of mineral oils of this character by continuous filtration. While a continuous vacuum filter has been specifically described, it is to be understood that the required pressure differential for filtration may be obtained by positive pressure within the filter casing, or by the combination of positive pressure within the filter casing with vacuum on the discharge side of the filtering surface.

Obviously many modifications and variations of the invention, as hereinbefore set forth, may be made without departing from the spirit and scope thereof, and therefore only such limitations should be imposed as are indicated in the appended claims.

I claim:

1. In the dewaxing of mineral oil by continuously filtering the chilled wax bearing mixture through a filtering surface which consecutively submerges within liquid and then emerges therefrom on each cycle, the method which comprises supplying the chilled wax bearing mixture in a continuous stream to the emerged filtering surface while subjecting the latter to a pressure differential, whereby to pass oil through the filtering surface and form a wax cake thereon, supplying a washing solvent to form the liquid bath which submerges a substantial portion of the order of half of the filtering surface, whereby the filtering surface with wax cake thereon continuously submerges within the washing solvent while the filtering surface is subjected to a pressure differential to pass solvent through the cake to wash retained oil therefrom, and then continuously removing the washed wax cake from the filtering surface after the latter emerges from the bath of washing solvent.

2. In the dewaxing of mineral oil by continuously filtering the chilled wax bearing mixture through a filtering surface which consecutively submerges within liquid and then emerges therefrom on each cycle, the method which comprises supplying the chilled wax bearing mixture in a continuous stream to the emerged filtering surface while subjecting the latter to a pressure differential, whereby to pass oil through the filtering surface and form a wax cake thereon, supplying a washing solvent to form the liquid bath which submerges a major portion of the filtering surface, whereby the filtering surface with wax cake thereon continuously submerges within the washing solvent while the filtering surface is subjected to a pressure differential to pass solvent through the cake to wash retained oil therefrom, continuing the pressure differential on the washed wax cake and filtering surface after the filtering surface with cake thereon emerges from the bath of washing solvent to thereby dry the cake, and then continuously removing the washed and dried wax cake from the filtering surface.

3. In the dewaxing of mineral oil by continuously filtering the chilled wax bearing mixture through a filtering surface which consecutively submerges within liquid and then emerges therefrom on each cycle, the method which comprises supplying the chilled wax bearing mixture in a continuous stream to the emerged filtering surface while subjecting the latter to a pressure differential, whereby to pass oil through the filtering surface and form a wax cake thereon, supplying a washing solvent to form the liquid bath which partially submerges the filtering surface, whereby the filtering surface with wax cake thereon continuously submerges within the washing solvent while the filtering surface is subjected to a pressure differential to pass solvent through the cake to wash retained oil therefrom, also supplying a washing solvent to the cake on the filtering surface after cake formation and prior to submergence within the liquid bath, and continuously removing the washed wax cake from the filtering surface after the latter emerges from the bath of washing solvent.

4. In the dewaxing of mineral oil by continuously filtering the chilled wax bearing mixture through a filtering surface which consecutively submerges within liquid and then emerges therefrom on each cycle, the method which comprises supplying the chilled wax bearing mixture in a continuous stream to the emerged filtering surface while subjecting the latter to a pressure differential, whereby to pass oil through the filtering surface and form a wax cake thereon, supplying a washing solvent to form the liquid bath which submerges at least half of the filtering surface, whereby the filtering surface with wax cake thereon continuously submerges within the washing solvent while the filtering surface is subjected to a pressure differential to pass solvent through the cake to wash retained oil therefrom, also supplying a washing solvent to the cake on the filtering surface after cake formation and prior to submergence within the liquid bath, continuing the pressure differential upon the filtering surface and wax cake carried thereby after the said filtering surface and wax cake emerge from the liquid bath to dry the cake, and then continuously removing the washed and dried wax cake from the filtering surface.

5. In the dewaxing of mineral oil by continuously filtering the chilled wax bearing mixture through a filtering surface which consecutively submerges within a liquid bath and then emerges therefrom on each cycle, the method which comprises supplying the chilled wax bearing mixture in a continuous stream to the emerged filtering surface while subjecting the latter to a pressure differential whereby to pass oil through the filtering surface and form a wax cake thereon, supplying a washing solvent to form the liquid bath which submerges a major portion of the filtering surface, whereby the filtering surface with wax cake thereon continuously submerges within the washing solvent, applying a pressure differential on the submerged filtering surface which is less than the pressure differential applied on the emerged filtering surface during cake formation to pass solvent through the cake to wash retained oil therefrom, and then continuously removing the washed wax cake from the filtering surface after the latter emerges from the bath of washing solvent.

6. In the dewaxing of mineral oil by continuously filtering the chilled wax bearing mixture through a rotary vacuum filtering surface which consecutively submerges within a liquid bath and then emerges therefrom on each cycle, the method which comprises supplying the chilled wax bearing mixture in a continuous stream to the emerged filtering surface while subjecting the latter to vacuum, whereby to draw oil through the filtering surface and form a wax cake thereon, supplying a washing solvent to form the liquid bath which partially submerges the filtering surface, whereby the filtering surface with wax cake thereon continuously submerges within the washing solvent, applying a different vacuum to the submerged filtering surface than the vacuum applied to the filtering surface in the emerged cake forming zone to draw washing solvent through the cake to wash retained oil therefrom, and then continuously removing the washed wax cake from the filtering surface after the latter emerges from the bath of washing solvent.

7. In the dewaxing of mineral oil by continuously filtering the chilled wax bearing mixture through a filtering surface which consecutively submerges within liquid and then emerges therefrom on each cycle, the method which comprises supplying the chilled wax bearing mixture in a continuous stream to the emerged filtering surface while subjecting the latter to a pressure differential, whereby to pass oil through the filtering surface and form a wax cake thereon, supplying a chilled organic liquid which is a nonsolvent for wax at the temperature thereof to form the liquid bath which submerges at least half of the filtering surface, whereby the filtering surface with wax cake thereon continuously submerges within the organic liquid while the filtering surface is subjected to a pressure differential to pass liquid through the cake to wash retained oil therefrom, surrounding exposed portions of the filtering surface with a chilled gas to maintain the exposed filtering surface and wax cake thereon at substantially the temperature of the chilled wax bearing mixture being filtered, continuing the application of the pressure differential after the filtering surface emerges from the organic liquid to pass chilled gas through the wax cake to assist in drying the cake, and then continuously removing the washed and dried wax cake from the emerged filtering surface.

WALTER V. OVERBAUGH.